United States Patent
Sumioka (10) Patent No.: US 10,474,048 B2
(45) Date of Patent: Nov. 12, 2019

(54) TONER

(71) Applicant: KYOCERA Document Solutions Inc., Osaka (JP)

(72) Inventor: Sho Sumioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/284,132

(22) Filed: Feb. 25, 2019

(65) Prior Publication Data

US 2019/0265604 A1  Aug. 29, 2019

(30) Foreign Application Priority Data

Feb. 26, 2018 (JP) ................... 2018-032099

(51) Int. Cl.
*G03G 9/093* (2006.01)
*G03G 9/08* (2006.01)
*B82Y 30/00* (2011.01)

(52) U.S. Cl.
CPC ....... *G03G 9/09314* (2013.01); *G03G 9/0823* (2013.01); *G03G 9/09357* (2013.01); *B82Y 30/00* (2013.01); *G03G 9/09392* (2013.01)

(58) Field of Classification Search
CPC ............ G03G 9/09314; G03G 9/0823; G03G 9/09357; G03G 9/09392; B82Y 30/00
See application file for complete search history.

(56) References Cited

U.S. PATENT DOCUMENTS

| 2005/0271964 | A1 | 12/2005 | Etou et al. | |
|---|---|---|---|---|
| 2015/0118612 | A1* | 4/2015 | Maetani | G03G 9/09328 430/109.1 |
| 2016/0116856 | A1* | 4/2016 | Ojima | G03G 9/09342 430/108.7 |
| 2018/0024454 | A1* | 1/2018 | Ojima | G03G 9/09321 430/108.1 |

FOREIGN PATENT DOCUMENTS

JP  2004-294469 A  10/2004

* cited by examiner

*Primary Examiner* — Thorl Chea
(74) *Attorney, Agent, or Firm* — Studebaker & Brackett PC (57) ABSTRACT

A toner includes toner particles. The toner particles each include a core, a shell layer, and an external additive. The core contains a first thermoplastic resin as a binder resin. The shell layer partially covers a surface of the core. The external additive is attached to regions of the surface of the core that are not covered with the shell layer. The external additive includes external additive particles. The external additive particles protrude outward in radial directions of the core further than a surface of the shell layer. At least part of surfaces of the external additive particles is exposed from the shell layer. The shell layer contains a second thermoplastic resin or a thermosetting resin. The second thermoplastic resin has a higher softening point than the core. The shell layer has a thickness of at least 5 nm.

8 Claims, 3 Drawing Sheets

TONER

INCORPORATION BY REFERENCE

The present application claims priority under 35 U.S.C. § 119 to Japanese Patent Application No. 2018-032099, filed on Feb. 26, 2018. The contents of this application are incorporated herein by reference in their entirety.

BACKGROUND

The present disclosure relates to a toner.

A known toner includes toner particles each including a core and a shell layer covering a surface of the core. Heat-resistant preservability of the toner can be improved by covering the core with the shell layer.

SUMMARY

A toner according to the present disclosure includes toner particles. The toner particles each include a core, a shell layer, and an external additive. The core contains a first thermoplastic resin as a binder resin. The shell layer partially covers a surface of the core. The external additive is attached to regions of the surface of the core that are not covered with the shell layer. The external additive includes external additive particles. The external additive particles protrude outward in radial directions of the core further than a surface of the shell layer. At least part of surfaces of the external additive particles is exposed from the shell layer. The shell layer contains a second thermoplastic resin or a thermosetting resin. The second thermoplastic resin has a higher softening point than the core. The shell layer has a thickness of at least 5 nm.

DETAILED DESCRIPTION

The following describes a preferable embodiment of the present disclosure. Note that a toner is a collection (for example, a powder) of toner particles. An external additive is a collection (for example, a powder) of external additive particles. Evaluation results (values indicating shape, physical properties, or the like) for a powder (specific examples include a powder of toner particles) are each a number average of values measured for an appropriate number of particles selected from the powder, unless otherwise stated.

A measured value for a volume median diameter ($D_{50}$) of a powder is a median diameter measured using a laser diffraction/scattering particle size distribution analyzer ("LA-950" manufactured by HORIBA, Ltd.), unless otherwise stated. A number average primary particle diameter of a powder (a number average primary particle diameter of particles) is a number average value of equivalent circle diameters of 100 primary particles (Heywood diameters: diameters of circles having the same areas as projected areas of the primary particles) measured using a scanning electron microscope, unless otherwise stated.

The term chargeability refers to chargeability in triboelectric charging, unless otherwise stated. Strength of positive chargeability (or strength of negative chargeability) in triboelectric charging can be confirmed from a known triboelectric series, for example. A toner (measurement target) is triboelectrically charged for example by mixing and stirring the toner with a standard carrier (N-01 for a negatively chargeable toner, P-01 for a positively chargeable toner) provided by The Imaging Society of Japan. An amount of charge of the measurement target is measured before and after triboelectric charging for example using a compact toner draw-off charge measurement system ("MODEL 212HS" manufactured by TREK, INC.). A measurement target having a greater difference in amount of charge between before and after triboelectric charging has stronger chargeability.

A measured value for a softening point (Tm) is a value measured using a capillary rheometer ("CFT-500D" manufactured by Shimadzu Corporation), unless otherwise stated. In an S-shaped curve (horizontal axis: temperature, vertical axis: stroke) plotted using the capillary rheometer, a temperature at which the stroke value is "(base line stroke value+maximum stroke value)/2" corresponds to Tm (softening point). A measured value for a melting point (Mp) is a temperature at a highest endothermic peak in a heat absorption curve (vertical axis: heat flow (DSC signal), horizontal axis: temperature) plotted using a differential scanning calorimeter ("DSC-6220" manufactured by Seiko Instruments Inc.), unless otherwise stated. The endothermic peak appears due to melting of a crystallized portion of a measurement target. A measured value for a glass transition point (Tg) is a value measured using a differential scanning calorimeter ("DSC-6220" manufactured by Seiko Instruments Inc.) according to "Japanese Industrial Standard (JIS) K7121-2012", unless otherwise stated. In a heat absorption curve (vertical axis: heat flow (DSC signal), horizontal axis: temperature) plotted using the differential scanning calorimeter, a temperature at an inflection point due to glass transition (specifically, a temperature at an intersection of an extrapolation of a base line and an extrapolation of an inclined portion of the curve) corresponds to Tg (glass transition point).

The term "main component" of a material refers to a component that accounts for a largest proportion among components of the material in terms of mass, unless otherwise stated.

Measured values for a number average molecular weight (Mn) and a mass average molecular weight (Mw) are values measured by gel permeation chromatography, unless otherwise stated.

A roundness (=perimeter of a circle having the same area as a projected area of a particle/perimeter of the particle) is a number average of values measured for an appropriate number of (for example, 3,000) particles using a flow particle imaging analyzer ("FPIA (registered Japanese trademark)-3000" manufactured by Sysmex Corporation), unless otherwise stated.

A measured value for a zeta potential is a value measured by laser Doppler electrophoresis in an aqueous medium adjusted to pH 4 and having a temperature of 25° C., unless otherwise stated. In a case where the measurement target is positively chargeable, a measured value for the zeta potential of the measurement target is a positive value. In a case where the measurement target is negatively chargeable, a measured value for the zeta potential of the measurement target is a negative value.

In the following description, the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. The term "(meth)acryl" may be used as a generic term encompassing both acryl and methacryl. The term "(meth)acrylonitrile" may be used as a generic term encompassing both acrylonitrile and methacrylonitrile.

<Toner>

A toner according to the present embodiment can be suitably used for development of electrostatic latent images, for example. The toner according to the present embodiment may be used as a one-component developer. Alternatively, the toner may be mixed with a carrier using a mixer (for example, a ball mill) to prepare a two-component developer.

The toner according to the present embodiment includes toner particles each including a core, a shell layer, and an external additive. The core contains a first thermoplastic resin as a binder resin. The shell layer partially covers a surface of the core. The external additive is attached to regions of the surface of the core that are not covered with the shell layer. The external additive includes external additive particles. The external additive particles protrude outward in radial directions of the core further than a surface of the shell layer. At least part of a surface of each external additive particle is exposed from the shell layer. The shell layer contains a second thermoplastic resin or a thermosetting resin. The second thermoplastic resin has a higher softening point than the core. The shell layer has a thickness of at least 5 nm. The thickness of the shell layer is measured by the same method as that described below in Examples or a method in accordance therewith. The core may contain an internal additive (for example, at least one of a colorant, a releasing agent, a charge control agent, and a magnetic powder), as necessary.

As a result of the above configuration, the toner according to the present embodiment has improved heat-resistant preservability and improved thermal-stress resistance. Reasons therefore are inferred as follows.

In the toner particles included in the toner according to the present embodiment, the external additive particles are attached to regions of surfaces of the cores containing the first thermoplastic resin, which regions are not covered with the shell layers. Further, the shell layers contain the second thermoplastic resin or a thermosetting resin. The second thermoplastic resin has a higher softening point than the cores. That is, in the toner particles included in the toner according to the present embodiment, the surfaces of the shell layers having relatively high hardness are exposed at surfaces of the toner particles, and the external additive particles are attached to the surfaces of the cores having relatively low hardness. In this configuration, it is possible to inhibit agglomeration of the toner particles as well as detachment of the external additive particles from the cores. It is thought that the toner according to the present embodiment can therefore have improved heat-resistant preservability.

Furthermore, in the toner particles included in the toner according to the present embodiment, at least part of the surface of each external additive particle is exposed from the shell layer. Also, the external additive particles protrude outward in the radial directions of the cores further than the surfaces of the shell layers. Further, the shell layers each have a thickness of at least 5 nm. In this configuration, the cores of the toner particles can be prevented from coming into contact with one another even when thermal stress is applied to the toner. It is thought that the toner according to the present embodiment can therefore have improved thermal-stress resistance.

A proportion (also referred to below as a coverage of the external additive) of an area of the regions covered with the external additive to an area of the surface of the core of the toner particle is preferably at least 20% and no greater than 30%. In a configuration in which the coverage of the external additive is at least 20% and no greater than 30%, it is possible to inhibit agglomeration of the toner particles as well as detachment of the external additive particles from the cores, resulting in further improvement in heat-resistant preservability. The coverage of the external additive is measured by the same method as that described below in Examples or a method in accordance therewith.

The following describes the toner according to the present embodiment in detail with reference to the accompanying drawings as necessary.

[Structure of Toner Particles]

Figure 1:
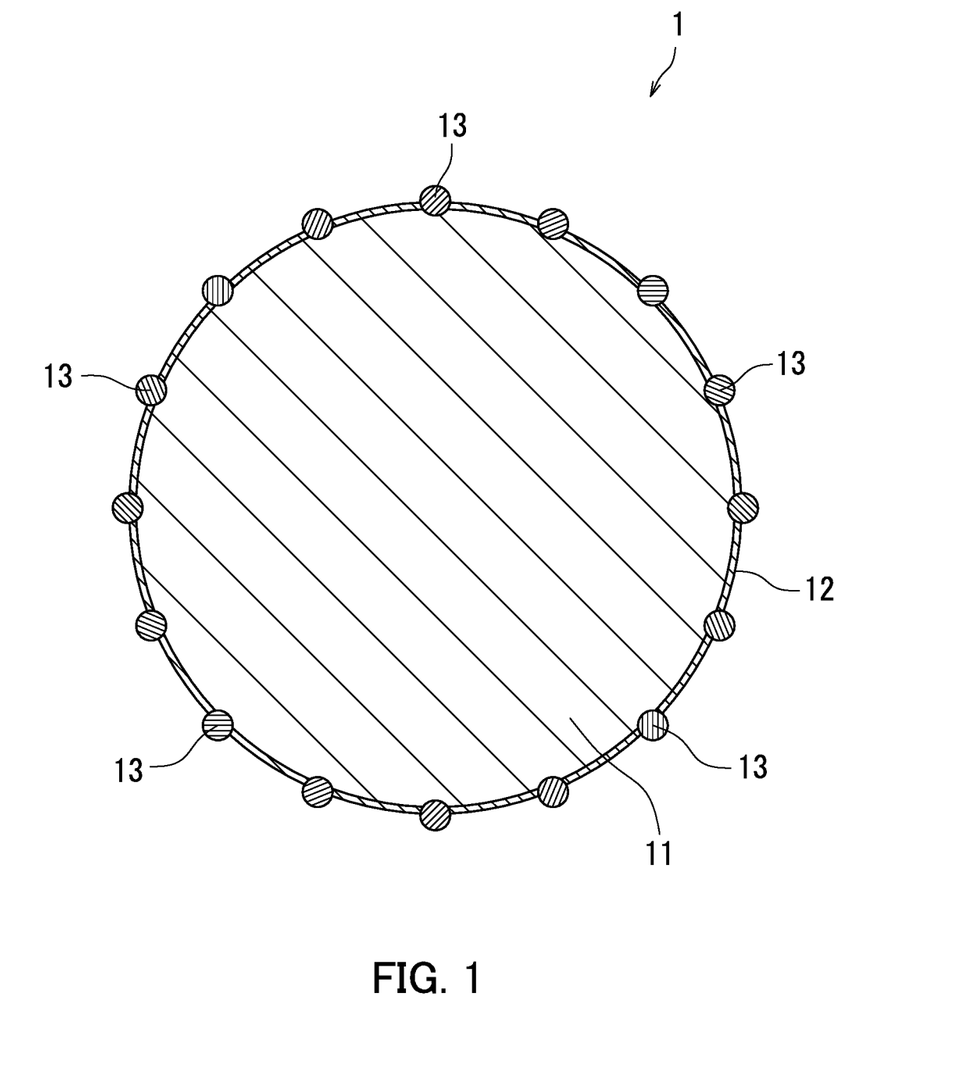
FIG. 1 is a diagram illustrating an example of a sectional structure of a toner particle included in a toner according to an embodiment of the present disclosure.
Figure 2:
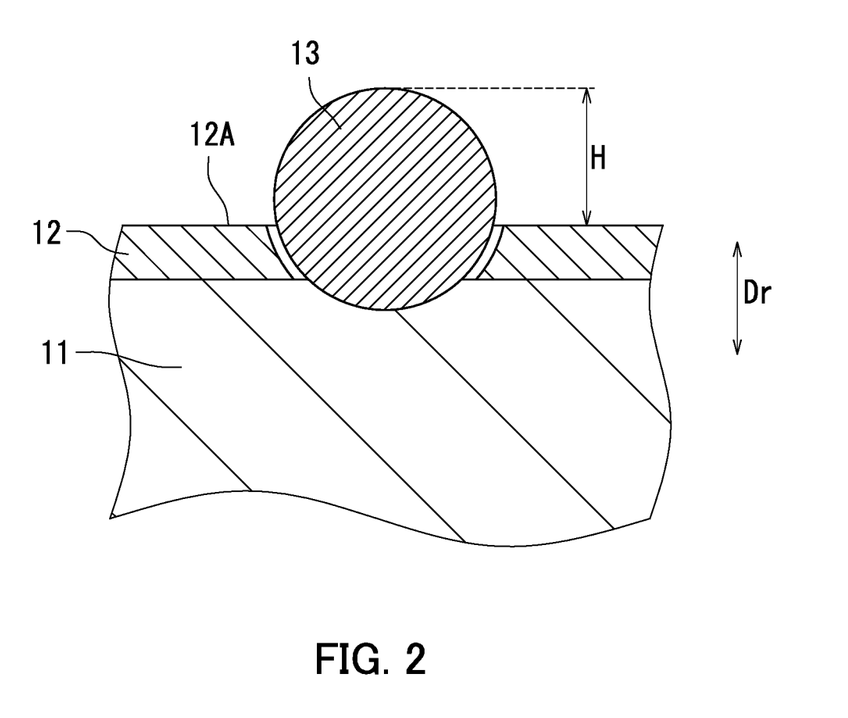
FIG. 2 is an enlarged view of part of a surface layer portion of the toner particle illustrated in FIG. 1.

The following describes a structure of the toner particles included in the toner according to the present embodiment with reference to FIGS. 1 and 2. FIG. 1 is a diagram illustrating an example of a sectional structure of a toner particle included in the toner according to the present embodiment. FIG. 2 is an enlarged view of part of a surface layer portion of the toner particle illustrated in FIG. 1.

As illustrated in FIG. 1, a toner particle 1 includes a core 11, a shell layer 12, and an external additive. The core 11 contains a first thermoplastic resin as a binder resin. The shell layer 12 partially covers a surface of the core 11. The external additive is attached to regions of the surface of the core 11 that are not covered with the shell layer 12. The external additive includes external additive particles 13. The shell layer 12 contains the second thermoplastic resin or a thermosetting resin. The second thermoplastic resin has a higher softening point than the core 11. The shell layer 12 has a thickness of at least 5 nm.

The external additive may cover either all or part of regions of the surface of the core 11 that are not covered with the shell layer 12. However, in order to further improve heat-resistant preservability and thermal-stress resistance, the external additive preferably covers all of the regions of the surface of the core 11 that are not covered with the shell layer 12.

As illustrated in FIG. 2, at least part of a surface of each external additive particle 13 is exposed from the shell layer 12. Also, the external additive particle 13 protrudes outward in a radial direction Dr of the core 11 further than a surface 12A of the shell layer 12. In order to further improve thermal-stress resistance, a height H of protruding portions of the external additive particles 13 is preferably at least 30 nm. In order to inhibit detachment of the external additive particles 13 from the cores 11 while inhibiting agglomeration of the toner particles 1, the height H of the protruding portions of the external additive particles 13 is preferably no higher than 200 nm. The height H of the protruding portions of the external additive particles 13 can be adjusted by changing at least one of the thickness of the shell layer 12 and a particle diameter of the external additive particles 13. Although FIG. 2 illustrates the external additive particle 13 partially embedded in the core 11, the external additive particle 13 may be attached to the core 11 without being partially embedded in the core 11. However, in order to improve adhesion between the external additive particle 13 and the core 11, the external additive particle 13 is preferably attached to the core 11 such that part of the external additive particle 13 is embedded in the core 11. Although FIG. 2 illustrates the surface 12A of the shell layer 12 with a straight line, the shell layer of a toner particle actually has a spherical surface.

The shell layer 12 may be substantially formed from either the thermosetting resin or the second thermoplastic resin, or may contain both the thermosetting resin and the second thermoplastic resin. Also, a material including a resin and an additive (for example, a charge control agent) may be used as a material of the shell layer 12. In order to further improve heat-resistant preservability and thermal-stress resistance, a proportion of an amount of at least one of the thermosetting resin and the second thermoplastic resin to an amount of the material of the shell layer 12 is preferably at least 80% by mass, more preferably at least 90% by mass, and particularly preferably 100% by mass.

In a case where the shell layer 12 contains the second thermoplastic resin, the softening point of the second thermoplastic resin is preferably at least 25° C. higher than the softening point of the core 11 in order to further improve heat-resistant preservability and thermal-stress resistance. Further, in a case where the shell layer 12 contains the second thermoplastic resin, a difference between the softening point of the second thermoplastic resin and the softening point of the core 11 is preferably no greater than 35° C. in order to improve low-temperature fixability of the toner. In a case where the shell layer 12 contains the second thermoplastic resin, the thickness of the shell layer 12 is preferably at least 40 nm in order to further improve heat-resistant preservability and thermal-stress resistance. Further, in a case where the shell layer 12 contains the second thermoplastic resin, the thickness of the shell layer 12 is preferably no greater than 50 nm in order to improve low-temperature fixability of the toner.

In a case where the shell layer 12 contains the thermosetting resin, the thickness of the shell layer 12 is preferably no greater than 6 nm in order to improve low-temperature fixability of the toner.

In order to further improve heat-resistant preservability and thermal-stress resistance, the external additive particles 13 preferably have a number average primary particle diameter of at least 100 nm. In order to inhibit detachment of the external additive particles 13 from the cores 11 as well as agglomeration of the toner particles 1, the number average primary particle diameter of the external additive particles 13 is preferably no greater than 200 nm.

In order that the toner can be suitable for use in image formation, the toner particles 1 preferably have a volume median diameter ($D_{50}$) of at least 4 μm and no greater than 9 μm.

Preferably, both the shell layer 12 and the external additive have a charging polarity opposite to a charging polarity of the core 11. In a configuration in which the shell layer 12 and the external additive have a charging polarity opposite to a charging polarity of the core 11, the toner according to the present embodiment can be easily produced by a production method A described below. For example, in a configuration (hereinafter may be referred to as a positively chargeable toner configuration) in which the shell layer 12 and the external additive have a positive charging polarity and the core 11 has a negative charging polarity, a positively chargeable toner as the toner according to the present embodiment can be easily produced by the production method A described below.

In order that both the shell layer 12 and the external additive have a charging polarity opposite to a charging polarity of the core 11, the shell layer 12 and the external additive are preferably formed from respective materials having the charging polarity opposite to the charging polarity of the core 11. In order to obtain a toner having the positively chargeable toner configuration, positively chargeable materials (for example, materials positively chargeable through friction with a carrier) are preferably used as the respective materials of the shell layer 12 and the external additive, and a negatively chargeable material (for example, a material negatively chargeable through friction with the carrier) is preferably used as a material of the core 11.

Examples of positively chargeable materials include materials having cationic functional groups. Examples of cationic functional groups include an amino group, quaternary ammonium cation groups, amide groups, and nitrogen-containing heterocyclic groups. Examples of nitrogen-containing heterocyclic groups include a pyridine ring group, a pyrazine ring group, a pyridazine ring group, a pyrimidine ring group, and a triazine ring group. A positively chargeable charge control agent can also be used as a positively chargeable material.

Examples of negatively chargeable materials include materials having anionic functional groups. Examples of anionic functional groups include ester groups, a hydroxyl group, ether groups, and acid groups. A negatively chargeable charge control agent can also be used as a negatively chargeable material.

[Components of Toner Particles]

The following describes components of the toner particles included in the toner according to the present embodiment.

(Binder Resin)

The binder resin constitutes a large proportion (for example, at least 70% by mass) of components of the core. Accordingly, properties of the binder resin are thought to have great influence on overall properties of the core. The properties (specific examples include the softening point and the acid value) of the binder resin can be adjusted through use of different resins in combination as the binder resin. Also, the softening point of the core can be adjusted by controlling the softening point of the binder resin.

The core contains the first thermoplastic resin as the binder resin. Examples of the first thermoplastic resin include styrene-based resins, acrylic acid ester-based resins (specific examples include acrylic acid ester polymers and methacrylic acid ester polymers), olefin-based resins (specific examples include polyethylene resins and polypropylene resins), vinyl resins (specific examples include vinyl chloride resins, polyvinyl alcohols, vinyl ether resins, and N-vinyl resins), polyester resins, polyamide resins, and urethane resins. A copolymer of any of the above-listed resins, that is, a copolymer formed through introduction of a repeating unit into any of the above-listed resins (specific examples include styrene-acrylic acid ester-based resins and styrene-butadiene-based resins) can also be used as the first thermoplastic resin.

The first thermoplastic resin can be obtained through addition polymerization, copolymerization, or condensation polymerization of at least one thermoplastic monomer. Note that a thermoplastic monomer is a monomer that forms a thermoplastic resin through homopolymerization (specific examples include acrylic acid ester-based monomers and styrene-based monomers) or a monomer that forms a thermoplastic resin through condensation polymerization (for example, a combination of a polyhydric alcohol and a polycarboxylic acid that form a polyester resin through condensation polymerization).

In order to obtain a toner having the positively chargeable toner configuration, the first thermoplastic resin is preferably a polyester resin.

A polyester resin can be obtained through condensation polymerization of at least one polyhydric alcohol and at least one polycarboxylic acid. Examples of alcohols that can be used for synthesis of a polyester resin include dihydric alcohols (specific examples include diols and bisphenols) and tri- or higher-hydric alcohols listed below. Examples of carboxylic acids that can be used for synthesis of a polyester resin include dibasic carboxylic acids and tri- or higher-basic carboxylic acids listed below. Note that a polycarboxylic acid derivative that can form an ester bond through condensation polymerization, such as a polycarboxylic acid anhydride or a polycarboxylic acid halide may be used instead of a polycarboxylic acid.

Examples of preferable diols include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of preferable bisphenols include bisphenol A, hydrogenated bisphenol A, bisphenol A ethylene oxide adduct, and bisphenol A propylene oxide adduct.

Examples of preferable tri- or higher-hydric alcohols include sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of preferable dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Examples of preferable tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

(Colorant)

The core may contain a colorant. A known pigment or dye that matches the color of the toner can be used as the colorant. In order to form high-quality images with the toner, the amount of the colorant is preferably at least 1 part by mass and no greater than 20 parts by mass relative to 100 parts by mass of the binder resin.

The core may contain a black colorant. Examples of black colorants include carbon black. A colorant adjusted to black color using a yellow colorant, a magenta colorant, and a cyan colorant may be used as a black colorant.

The core may contain a non-black colorant. Examples of non-black colorants include a yellow colorant, a magenta colorant, and a cyan colorant.

At least one compound selected from the group consisting of condensed azo compounds, isoindolinone compounds, anthraquinone compounds, azo metal complexes, methine compounds, and arylamide compounds can for example be used as the yellow colorant. Examples of yellow colorants include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194), Naphthol Yellow S, Hansa Yellow G, and C.I. Vat Yellow.

At least one compound selected from the group consisting of condensed azo compounds, diketopyrrolopyrrole compounds, anthraquinone compounds, quinacridone compounds, basic dye lake compounds, naphthol compounds, benzimidazolone compounds, thioindigo compounds, and perylene compounds can for example be used as the magenta colorant. Examples of magenta colorants include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, and 254).

At least one compound selected from the group consisting of copper phthalocyanine compounds, anthraquinone compounds, and basic dye lake compounds can for example be used as the cyan colorant. Examples of cyan colorants include C.I. Pigment Blue (1, 7, 15, 15:1, 15:2, 15:3, 15:4, 60, 62, and 66), Phthalocyanine Blue, C.I. Vat Blue, and C.I. Acid Blue.

(Releasing Agent)

The core may contain a releasing agent. The releasing agent is used in order to improve hot-offset resistance of the toner, for example. In order to improve hot-offset resistance of the toner, the amount of the releasing agent is preferably at least 1 part by mass and no greater than 20 parts by mass relative to 100 parts by mass of the binder resin.

Examples of releasing agents that can be preferably used include: aliphatic hydrocarbon-based waxes such as low molecular weight polyethylene, low molecular weight polypropylene, polyolefin copolymer, polyolefin wax, microcrystalline wax, paraffin wax, and Fischer-Tropsch wax; oxides of aliphatic hydrocarbon-based waxes such as polyethylene oxide wax and block copolymer thereof; plant waxes such as candelilla wax, carnauba wax, Japan wax, jojoba wax, and rice wax; animal waxes such as beeswax, lanolin, and spermaceti; mineral waxes such as ozokerite, ceresin, and petrolatum; ester waxes containing a fatty acid ester as a main component such as montanic acid ester wax and castor wax; and waxes in which a fatty acid ester is partially or wholly deoxidized (for example, deoxidized carnauba wax). In the present embodiment, a releasing agent may be used independently or two or more releasing agents may be used in combination.

(Charge Control Agent)

A charge control agent is used in order to improve charge stability or a charge rise characteristic of the toner, for example. The charge rise characteristic of the toner is an indicator as to whether or not the toner is chargeable to a specific charge level in a short period of time. However, the core need not contain a charge control agent so long as it can be ensured that the toner has sufficient chargeability.

Anionic strength of the core can be increased through a negatively chargeable charge control agent contained in the core. Cationic strength of the core can be increased through a positively chargeable charge control agent contained in the core.

Examples of positively chargeable charge control agents include: azine compounds such as pyridazine, pyrimidine, pyrazine, 1,2-oxazine, 1,3-oxazine, 1,4-oxazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes such as Azine Fast Red FC, Azine Fast Red 12BK, Azine Violet BO, Azine Brown 3G, Azine Light Brown GR, Azine Dark Green BH/C, Azine Deep Black EW, and Azine Deep Black 3RL; acid dyes such as Nigrosine BK, Nigrosine NB, and Nigrosine Z; metal salts of naphthenic acid; metal salts of higher organic carboxylic acid; alkoxylated amine; alkylamide; and quaternary ammonium salts such as benzyldecylhexylmethylammonium chloride, decyltrimethylammonium chloride, 2-(methacryloyloxy) ethyltrimethylammonium chloride, and dimethylaminopropyl acrylamide methyl chloride quaternary salt.

Examples of negatively chargeable charge control agents include organic metal complexes, which are chelate compounds. Examples of preferable organic metal complexes include metal acetylacetonate complexes, salts thereof, salicylic acid-based metal complexes, and salts thereof.

In the present embodiment, a charge control agent may be used independently or two or more charge control agents may be used in combination. In order to improve charge stability, the amount of the charge control agent(s) is preferably at least 0.1 parts by mass and no greater than 10 parts by mass relative to 100 parts by mass of the binder resin.

(Magnetic Powder)

The core may contain a magnetic powder. Examples of materials of the magnetic powder include ferromagnetic metals (specific examples include iron, cobalt, and nickel), alloys of ferromagnetic metals, ferromagnetic metal oxides (specific examples include ferrite, magnetite, and chromium dioxide), and materials subjected to ferromagnetization (specific examples include carbon materials rendered ferromagnetic through thermal treatment). In the present embodiment, a magnetic powder may be used independently or two or more magnetic powders may be used in combination.

(Shell Layer)

The shell layer contains at least one of the thermosetting resin and the second thermoplastic resin. No particular limitation is placed on the second thermoplastic resin other than being a thermoplastic resin having a higher softening point than the core. Examples of thermoplastic resins that can be used as the second thermoplastic resin include those listed above as examples of the first thermoplastic resin contained in the core.

In order to obtain a toner having the positively chargeable toner configuration in a case where the shell layer contains the thermosetting resin, the thermosetting resin is preferably at least one resin selected from the group consisting of a urea resin, a melamine resin, and a benzoguanamine resin, and is more preferably a melamine resin.

In order to obtain a toner having the positively chargeable toner configuration in a case where the shell layer contains the second thermoplastic resin, the second thermoplastic resin is preferably a thermoplastic resin having a quaternary ammonium cation group.

Examples of thermoplastic resins having a quaternary ammonium cation group include polymers of vinyl compounds having a quaternary ammonium cation group and copolymers of vinyl compounds having a quaternary ammonium cation group and other vinyl compounds. Note that a vinyl compound is a compound having a vinyl group ($CH_2=CH-$) or a chemical group formed through replacement of a hydrogen atom in the vinyl group (specific examples include ethylene, propylene, butadiene, vinyl chloride, (meth)acrylic acid, methyl (meth)acrylate, (meth) acrylonitrile, and styrene). A vinyl compound can form a macromolecule (resin) by addition polymerization through carbon-to-carbon double bonds ($C=C$) included in the above chemical groups such as the vinyl group.

Examples of vinyl compounds having a quaternary ammonium cation group include vinylbenzyl trialkyl ammonium salts, 2-(acryloyloxy)ethyl trialkyl ammonium salts, and 2-(methacryloyloxy)ethyl trialkyl ammonium salts. Also, a compound obtained through quaternization of a vinyl compound having a tertiary amino group such as 2-(diethylamino)ethyl methacrylate may be used as a vinyl compound having a quaternary ammonium cation group.

Examples of vinylbenzyl trialkyl ammonium salts include vinylbenzyl trimethyl ammonium salts (specific examples include vinylbenzyl trimethyl ammonium chloride), vinylbenzyl triethyl ammonium salts (specific examples include vinylbenzyl triethyl ammonium chloride), vinylbenzyl dimethyl ethyl ammonium salts (specific examples include vinylbenzyl dimethyl ethyl ammonium chloride), vinylbenzyl dimethyl isopropyl ammonium salts (specific examples include vinylbenzyl dimethyl isopropyl ammonium chloride), vinylbenzyl n-butyl dimethyl ammonium salts (specific examples include vinylbenzyl n-butyl dimethyl ammonium chloride), and vinylbenzyl dimethyl pentyl ammonium salts (specific examples include vinylbenzyl dimethyl pentyl ammonium chloride).

Examples of 2-(acryloyloxy)ethyl trialkyl ammonium salts include 2-(acryloyloxy)ethyl trimethyl ammonium salts (specific examples include 2-(acryloyloxy)ethyl trimethyl ammonium chloride), 2-(acryloyloxy)ethyl dimethyl ethyl ammonium salts (specific examples include 2-(acryloyloxy) ethyl dimethyl ethyl ammonium chloride), 2-(acryloyloxy) ethyl triethyl ammonium salts (specific examples include 2-(acryloyloxy)ethyl triethyl ammonium chloride), and 2-(acryloyloxy)ethyl dimethyl n-pentyl ammonium salts (specific examples include 2-(acryloyloxy)ethyl dimethyl n-pentyl ammonium chloride).

Examples of 2-(methacryloyloxy)ethyl trialkyl ammonium salts include 2-(methacryloyloxy)ethyl trimethyl ammonium salts (specific examples include 2-(methacryloyloxy)ethyl trimethyl ammonium chloride), 2-(methacryloyloxy)ethyl dimethyl ethyl ammonium salts (specific examples include 2-(methacryloyloxy)ethyl dimethyl ethyl ammonium chloride), and 2-(methacryloyloxy)ethyl dimethyl n-pentyl ammonium salts (specific examples include 2-(methacryloyloxy)ethyl dimethyl n-pentyl ammonium chloride).

Examples of other vinyl compounds that can be copolymerized with vinyl compounds having a quaternary ammonium cation group include: styrene-based compounds such as styrene, o-methylstyrene, m-methylstyrene, p-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, and p-n-dodecylstyrene; acrylic acid ester-based compounds such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, lauryl (meth)acrylate, and phenyl (meth)acrylate; (meth)acrylic acid; and (meth)acrylonitrile. A vinyl compound having a quaternary ammonium cation group may be copolymerized with one or more of the above-listed other vinyl compounds.

(External Additive)

The external additive particles included in the external additive are preferably inorganic particles, and more preferably silica particles or particles of a metal oxide (specific examples include alumina, titania, magnesium oxide, zinc oxide, strontium titanate, and barium titanate). In the present embodiment, one type of external additive particles may be used independently or two or more types of external additive particles may be used in combination.

The external additive particles may be subjected to surface treatment. For example, when silica particles are used as the external additive particles, surfaces of the silica particles may be rendered hydrophobic and/or positively chargeable through use of one or more surface treatment agents. Examples of surface treatment agents include coupling agents (specific examples include silane coupling agents, titanate coupling agents, and aluminate coupling agents), silazane compounds (specific examples include chain silazane compounds and cyclic silazane compounds), and silicone oils (specific examples include dimethyl silicone oil). Particularly preferable surface treatment agents are silane coupling agents and silazane compounds. Examples of preferable silane coupling agents include silane compounds (specific examples include methyltrimethoxysilane and aminosilane). Examples of preferable silazane compounds include hexamethyldisilazane (HMDS). When a surface of a silica base (an untreated silica particle) is treated with a surface treatment agent, part or all of a number of hydroxyl groups (—OH) present on the surface of the silica base are substituted with functional groups derived from the surface treatment agent. As a result, a silica particle having the functional groups derived from the surface treatment agent (specifically, functional groups having stronger hydrophobicity and/or stronger positive chargeability than the hydroxyl groups) on the surface thereof is obtained.

In order to obtain a toner having the positively chargeable toner configuration, positively chargeable silica particles surface-treated with an aminosilane and positively chargeable titania particles surface-treated with an aminosilane are preferable as the external additive particles. Examples of aminosilanes include 3-aminopropyltrimethoxysilane, 3-aminopropyltriethoxysilane, N-2-(aminoethyl)-3-aminopropylmethyldimethoxysilane, and N-2-(aminoethyl)-3-aminopropyltrimethoxysilane.

In order to improve fluidity or handleability of the toner, the amount of the external additive is preferably at least 0.1 parts by mass and no greater than 20 parts by mass relative to 100 parts by mass of the cores.

(Combination of Materials)

In order to obtain a toner having further improved heat-resistant preservability and further improved thermal-stress resistance and having the positively chargeable toner configuration, it is preferable that the core contains a polyester resin as the binder resin, the shell layer contains either or both of a thermoplastic resin having a quaternary ammonium cation group and a melamine resin, and the external additive includes either or both of positively chargeable silica particles surface-treated with an aminosilane and positively chargeable titania particles surface-treated with an aminosilane.

[Toner Production Method]

The following describes a preferable method (also referred to below as the production method A) for producing the toner according to the present embodiment. The production method A includes preparation of the cores (core preparation process), attachment of the external additive (external additive attachment process), and formation of the shell layers (shell layer formation process). The production method A may further include a washing process, a drying process, and a deagglomeration process after the shell layer formation process. Examples of the washing process, the drying process, and the deagglomeration process will be described in Examples.

(Core Preparation Process)

The cores are prepared in the core preparation process for example by a pulverization method or an aggregation method.

In an example of pulverization methods, initially, the binder resin and one or more internal additives added as necessary are mixed. Subsequently, the resultant mixture is melt-kneaded using a melt-kneader (for example, a single-screw or twin-screw extruder). Subsequently, the resultant melt-kneaded product is pulverized and classified. Through the above, the cores are obtained.

In an example of aggregation methods, initially, fine particles of the binder resin and fine particles of one or more internal additives added as necessary are caused to aggregate in an aqueous medium until aggregated particles having a desired particle diameter are formed. Through the above, the aggregated particles containing the binder resin and the like are formed. Subsequently, the aggregated particles are heated to cause coalescence of components contained in the aggregated particles. Through the above, the cores are obtained.

(External Additive Attachment Process)

Next, the external additive is attached to part of surfaces of the cores. Through this process, external additive-attached cores including the cores and the external additive attached to the part of the surfaces of the cores are obtained. An example of methods for attaching the external additive to the part of the surfaces of the cores is a method that involves mixing the cores and the external additive particles through stirring using a mixer, for example.

(Shell Layer Formation Process)

Next, the shell layers are formed on regions of surfaces of the external additive-attached cores to which the external additive is not attached. Examples of methods for forming the shell layers include in-situ polymerization, in-liquid curing film coating, and coacervation. More specifically, in an example of methods for forming the shell layers on the surfaces of the external additive-attached cores, a raw material for forming the shell layers (a shell raw material) and the external additive-attached cores are added to an aqueous medium, and the aqueous medium is then heated to cause a reaction (for example, a thermal curing reaction) of the shell raw material to proceed on the surfaces of the external additive-attached cores. According to this method, the thickness of the shell layers can be adjusted by changing an amount of the shell raw material. When the shell raw material and a material of the external additive have a charging polarity differing from that of a material of the cores, the reaction of the shell raw material proceeds selectively on the regions of the surfaces of the external additive-attached cores to which the external additive is not attached. In order to obtain a toner having the positively chargeable toner configuration, it is preferable to use a positively chargeable material as the shell raw material, use a positively chargeable material as the material of the external additive, and use a negatively chargeable material as the material of the cores.

A resin particle dispersion may be used as the shell raw material. For example, a dispersion of resin particles containing a positively chargeable material (a dispersion of positively chargeable resin particles) can be used in formation of positively chargeable shell layers. Alternatively, a dispersion of resin particles containing a negatively chargeable material (a dispersion of negatively chargeable resin particles) can be used in formation of negatively chargeable shell layers. More specifically, in an example of methods for forming the shell layers on the surfaces of the external additive-attached cores, the external additive-attached cores and the resin particle dispersion are added to an aqueous medium, and the aqueous medium is then heated to cause formation of films from the resin particles (bonding of the resin particles to one another) to proceed on the surfaces of the external additive-attached cores. According to this method, the thickness of the shell layers can be adjusted by changing an amount of the resin particle dispersion. When a material of the resin particles and the material of the external additive have a charging polarity differing from that of the material of the cores, formation of the films from the resin particles proceeds selectively on the regions of the surfaces of the external additive-attached cores to which the external additive is not attached. In order to obtain a toner having the positively chargeable toner configuration, it is preferable to use a positively chargeable material as the material of the resin particles, use a positively chargeable material as the material of the external additive, and use a negatively chargeable material as the material of the cores. In order to further improve low-temperature fixability and heat-resistant preservability, the resin particles preferably have a number average primary particle diameter of at least 40 nm and no greater than 60 nm.

The toner according to the present embodiment can be easily produced by the production method A described above. Note that the method for producing the toner according to the present embodiment is not limited to the production method A. The toner according to the present embodiment may be produced for example by a method that involves partially covering the surfaces of the cores with the shell layers, and then attaching the external additive to regions of the surfaces of the cores that are not covered with the shell layers.

EXAMPLES

The following describes examples of the present disclosure. The following first describes methods for measuring a softening point and a glass transition point.

<Measurement of Softening Point (Tm)>

A sample (specific examples include cores and a thermoplastic resin) was loaded into a capillary rheometer ("CFT-500D" manufactured by Shimadzu Corporation). Subsequently, an S-shaped curve (horizontal axis: temperature, vertical axis: stroke) of the sample was plotted by causing melt-flow of 1 cm$^3$ of the sample under the following conditions: a die pore diameter of 1 mm, a plunger load of 20 kg/cm$^2$, and a heating rate of 6° C./minutes. A softening point of the sample was read from the plotted S-shaped curve. In the S-shaped curve, a temperature at which the stroke value is "$(S_1+S_2)/2$", where $S_1$ represents a maximum stroke value and $S_2$ represents a stroke value of a base line on low temperature side, corresponds to the softening point (Tm) of the sample.

<Measurement of Glass Transition Point (Tg)>

A differential scanning calorimeter ("DSC-6220" manufactured by Seiko Instruments Inc.) was used as a measurement device. First, 10 mg of a sample (specific examples include cores and a thermoplastic resin) was placed on an aluminum pan (an aluminum container), and the aluminum pan was set in a measurement section of the measurement device. An empty aluminum pan was also used as a reference. Next, a temperature of the measurement section was increased from a measurement start temperature of −20° C. up to 150° C. at a rate of 10° C./minute (first heating: RUN 1). Thereafter, the temperature of the measurement section was reduced from 150° C. to −20° C. at a rate of 10° C./minute. Subsequently, the temperature of the measurement section was increased again from −20° C. up to 150° C. at a rate of 10° C./minute (second heating: RUN 2). A heat absorption curve (vertical axis: heat flow (DSC signal), horizontal axis: temperature) of the sample was plotted in RUN 2. A glass transition point of the sample was read from the plotted heat absorption curve. In the heat absorption curve plotted in RUN 2, a temperature (onset temperature) at an inflection point due to glass transition (an intersection of an extrapolation of a base line and an extrapolation of an inclined portion of the curve) corresponds to the glass transition point (Tg) of the sample.

<Preparation of Cores CA>

A 5-L four-necked flask equipped with a thermometer (thermocouple), a drainage tube, a nitrogen inlet tube, a rectification column, and a stirrer was set in an oil bath and charged with 1,200 g of 1,2-propanediol, 1,700 g of terephthalic acid, and 3 g of tin(II) dioctanoate. Subsequently, a reaction (specifically, condensation reaction) of the flask contents was caused for 15 hours in a nitrogen atmosphere at a temperature of 230° C. Subsequently, the inside of the flask was depressurized and the flask contents were caused to react in the depressurized atmosphere (pressure: 8.0 kPa) at the temperature of 230° C. until Tm of a reaction product (polyester resin) reached a specific temperature (100° C.). As a result, a polyester resin having Tg of 48° C. and Tm of 100° C. was obtained.

Then, 100 parts by mass of the polyester resin obtained as above, 5 parts by mass of a colorant (C.I. Pigment Blue 15:3, ingredient: copper phthalocyanine pigment), and 5 parts by mass of a releasing agent ("NISSAN ELECTOL (registered Japanese trademark) WEP-3" manufactured by NOF Corporation, ester wax having a melting point of 73° C.) were mixed (dry mixing) using an FM mixer ("FM-10C/I" manufactured by Nippon Coke & Engineering Co., Ltd.) at a rotational speed of 2,400 rpm.

Subsequently, the resultant mixture was melt-kneaded using a twin-screw extruder ("PCM-30" manufactured by Ikegai Corp.). Thereafter, the resultant kneaded product was cooled. Subsequently, the cooled kneaded product was pulverized using a mechanical pulverizer ("TURBO MILL T250" manufactured by FREUND-TURBO CORPORATION) under a condition of a set particle diameter of 5.6 μm. Subsequently, the resultant pulverized product was classified using a classifier ("ELBOW JET TYPE EJ-LABO" manufactured by Nittetsu Mining Co., Ltd.). As a result, a powder of cores CA having a volume median diameter ($D_{50}$) of 6.0 μm was obtained. The cores CA had a roundness of 0.931, Tg of 50° C., Tm of 98° C., and a zeta potential at pH 4 of −20 mV. An amount of triboelectric charge of the cores CA measured through friction with a standard carrier N-01 (standard carrier for negatively chargeable toners, provided by The Imaging Society of Japan) was −20 μC/g. It was evident from the zeta potential and the amount of triboelectric charge that the cores CA were anionic (negatively chargeable).

<Preparation of Positively Chargeable Resin Particle Dispersions>

[Preparation of Positively Chargeable Resin Particle Dispersion PA]

A 2-L flask equipped with a thermometer (thermocouple), a nitrogen inlet tube, a stirrer, and a condenser (heat exchanger) was charged with 250 g of isobutyl alcohol, 6 g of 2-(diethylamino)ethyl methacrylate, and 6 g of methyl p-toluenesulfonate. Subsequently, a reaction (quaternization reaction) of the flask contents was caused for 1 hour in a nitrogen atmosphere at a temperature of 80° C. Subsequently, 230 g of n-butyl acrylate and 12 g of a polymerization initiator (t-butylperoxy-2-ethylhexanoate, manufactured by Arkema Yoshitomi, Ltd.) were further added into the flask while nitrogen gas was introduced into the flask. Subsequently, the flask contents were stirred for 3 hours while the internal temperature of the flask was kept at 95° C. (polymerization temperature). Thereafter, 12 g of the polymerization initiator (t-butylperoxy-2-ethylhexanote, manufactured by Arkema Yoshitomi, Ltd.) was further added into the flask, and the flask contents were stirred for 3 hours while the internal temperature of the flask was kept at 95° C.

Subsequently, the flask contents were dried in an environment at a temperature of 140° C. and a pressure of 10 kPa to remove isobutyl alcohol. Subsequently, the flask contents were deagglomerated to obtain a coarsely pulverized product. Subsequently, the coarsely pulverized product was further pulverized using a mechanical pulverizer ("TURBO MILL T250" manufactured by FREUND-TURBO CORPORATION) under a condition of a set particle diameter of 10 μm to obtain a finely pulverized product. Subsequently, 100 g of the resultant finely pulverized product, 2 g of a cationic surfactant ("QUARTAMIN (registered Japanese trademark) 24P" manufactured by Kao Corporation, 25% by mass aqueous lauryltrimethylammonium chloride solution), and 25 g of a 0.1 mol/L aqueous sodium hydroxide solution were mixed to obtain a dispersion.

Subsequently, ion exchanged water was added to the obtained dispersion to prepare a slurry in a whole amount of 400 g. The obtained slurry was placed in a pressure-resistant round bottom vessel made of stainless steel. Subsequently, the slurry was subjected to shear dispersion for 30 minutes using a high-speed shear emulsification device ("CLEAR-MIX (registered Japanese trademark) CLM-2.2S" manufactured by M Technique Co., Ltd.) in an environment at a temperature of 140° C. and a pressure of 0.5 MPa under a condition of a rotor rotational speed of 20,000 rpm. Thereafter, the vessel contents were stirred under a condition of a rotor rotational speed of 15,000 rpm while the vessel contents were cooled at a rate of 5° C./minute until the internal temperature of the vessel reached 50° C. Through the above, a dispersion (positively chargeable resin particle dispersion PA) containing positively chargeable resin particles (particles formed from a thermoplastic resin having a quaternary ammonium cation group) and having a solid concentration of 30% by mass was obtained. The positively chargeable resin particles contained in the obtained positively chargeable resin particle dispersion PA had a number average primary particle diameter of 50 nm, Tg of 59° C., Tm of 124° C., and a zeta potential at pH 4 of 21 mV. It was evident from the zeta potential that the positively chargeable resin particles contained in the positively chargeable resin particle dispersion PA were cationic (positively chargeable).

[Preparation of Positively Chargeable Resin Particle Dispersion PB]

A dispersion (positively chargeable resin particle dispersion PB) containing positively chargeable resin particles (particles formed from a thermoplastic resin having a quaternary ammonium cation group) and having a solid concentration of 30% by mass was obtained by the same method as that for preparation of the positively chargeable resin particle dispersion PA in all aspects other than that the monomer further added into the flask after the quaternization reaction and the amount of the monomer were changed from 230 g of n-butyl acrylate to 155 g of styrene and 75 g of n-butyl acrylate. The positively chargeable resin particles contained in the obtained positively chargeable resin particle dispersion PB had a number average primary particle diameter of 50 nm, Tg of 60° C., Tm of 125° C., and a zeta potential at pH 4 of 20 mV. It was evident from the zeta potential that the positively chargeable resin particles contained in the positively chargeable resin particle dispersion PB were cationic (positively chargeable).

[Preparation of Positively Chargeable Resin Particle Dispersion PC]

A dispersion (positively chargeable resin particle dispersion PC) containing positively chargeable resin particles (particles formed from a thermoplastic resin having a quaternary ammonium cation group) and having a solid concentration of 30% by mass was obtained by the same method as that for preparation of the positively chargeable resin particle dispersion PA in all aspects other than that the monomer further added into the flask after the quaternization reaction and the amount of the monomer were changed from 230 g of n-butyl acrylate to 120 g of styrene and 110 g of n-butyl acrylate. Note that Tm of a copolymer (thermoplastic resin) obtained through copolymerization of styrene and n-butyl acrylate tends to decrease with a decrease in ratio (molar ratio) of the amount of styrene. The positively chargeable resin particles contained in the obtained positively chargeable resin particle dispersion PC had a number average primary particle diameter of 50 nm, Tg of 40° C., Tm of 95° C., and a zeta potential at pH 4 of 20 mV. It was evident from the zeta potential that the positively chargeable resin particles contained in the positively chargeable resin particle dispersion PC were cationic (positively chargeable).

<Preparation of Negatively Chargeable Resin Particle Dispersions>

[Preparation of Negatively Chargeable Resin Particle Dispersion NA]

A 2-L flask equipped with a thermometer (thermocouple), a nitrogen inlet tube, a stirrer, and a condenser (heat exchanger) was charged with 250 g of isobutyl alcohol, and thereafter, 230 g of n-butyl acrylate and 24 g of a polymerization initiator (t-butylperoxy-2-ethylhexanoate, manufactured by Arkema Yoshitomi, Ltd.) were added into the flask while nitrogen gas was introduced into the flask. Subsequently, the flask contents were stirred for 3 hours while the internal temperature of the flask was kept at 95° C. (polymerization temperature). Thereafter, 12 g of the polymerization initiator (t-butylperoxy-2-ethylhexanoate, manufactured by Arkema Yoshitomi, Ltd.) was further added into the flask, and the flask contents were stirred for 3 hours while the internal temperature of the flask was kept at 95° C.

Subsequently, the flask contents were dried in an environment at a temperature of 140° C. and a pressure of 10 kPa to remove isobutyl alcohol. Subsequently, the flask contents were deagglomerated to obtain a coarsely pulverized product. Subsequently, the coarsely pulverized product was further pulverized using a mechanical pulverizer ("TURBO MILL T250" manufactured by FREUND-TURBO CORPORATION) under a condition of a set particle diameter of 10 μm to obtain a finely pulverized product. Subsequently, 100 g of the resultant finely pulverized product, 2 g of a cationic surfactant ("QUARTAMIN (registered Japanese trademark) 24P" manufactured by Kao Corporation, 25% by mass aqueous lauryltrimethylammonium chloride solution), and 25 g of a 0.1 mol/L aqueous sodium hydroxide solution were mixed to obtain a dispersion.

Subsequently, ion exchanged water was added to the obtained dispersion to prepare a slurry in a whole amount of 400 g. The obtained slurry was placed in a pressure-resistant round bottom vessel made of stainless steel. Subsequently, the slurry was subjected to shear dispersion for 30 minutes using a high-speed shear emulsification device ("CLEARMIX (registered Japanese trademark) CLM-2.2S" manufactured by M Technique Co., Ltd.) in an environment at a temperature of 140° C. and a pressure of 0.5 MPa under a condition of a rotor rotational speed of 20,000 rpm. Thereafter, the vessel contents were stirred under a condition of a rotor rotational speed of 15,000 rpm while the vessel contents were cooled at a rate of 5° C./minute until the internal temperature of the vessel reached 50° C. Through the above, a dispersion (negatively chargeable resin particle dispersion NA) containing negatively chargeable resin particles (particles formed from an n-butyl acrylate polymer) and having a solid concentration of 30% by mass was obtained. The negatively chargeable resin particles contained in the obtained negatively chargeable resin particle dispersion NA had a number average primary particle diameter of 50 nm, Tg of 58° C., Tm of 122° C., and a zeta potential at pH 4 of −19 mV. It was evident from the zeta potential that the negatively chargeable resin particles contained in the negatively chargeable resin particle dispersion NA were anionic (negatively chargeable).

[Preparation of Negatively Chargeable Resin Particle Dispersion NB]

A reaction vessel was charged with 25 parts by mole of a bisphenol A propylene oxide adduct (average number of moles of added propylene oxide: 2 mol), 25 parts by mole of a bisphenol A ethylene oxide adduct (average number of moles of added ethylene oxide: 2 mol), 40 parts by mole of fumaric acid, and 10 parts by mole of trimellitic acid. Subsequently, the vessel contents were caused to react in the presence of a catalyst (dibutyl tin oxide) in a nitrogen atmosphere. Through the above, a polyester resin having a number average molecular weight (Mn) of 5,500, a mass average molecular weight (Mw) of 11,000, a molecular weight distribution (Mw/Mn) of 2.0, Tg of 59° C., and Tm of 122° C. was obtained.

Next, 1,300 g of the polyester resin obtained as above was placed in a vessel set in a mixer ("T. K. HIVIS DISPER MIX MODEL HM-3D-5", manufactured by PRIMIX Corporation) equipped with a temperature adjustment jacket, and the vessel contents were melt-kneaded at a temperature of 120° C. Subsequently, 100 g of triethanolamine and 80 g of a 25% by mass aqueous solution of an anionic surfactant ("EMAL (registered Japanese trademark) 0" manufactured by Kao Corporation, ingredient: sodium lauryl sulfate) were added into the vessel, and the vessel contents were kneaded for 15 minutes under a condition of a planetary rotational speed of 50 rpm. Subsequently, 2,870 g of ion exchanged water at a temperature of 98° C. was added into the vessel at a rate of 50 g/minute to obtain a polyester resin emulsion. Thereafter, the vessel contents were cooled at a rate of 5° C./minute until the internal temperature of the vessel reached 50° C. Through the above, a dispersion (negatively chargeable resin particle dispersion NB) containing negatively chargeable resin particles (particles formed from the polyester resin) and having a solid concentration of 30% by mass was obtained. The negatively chargeable resin particles contained in the obtained negatively chargeable resin particle dispersion NB had a number average primary particle diameter of 50 nm, Tg of 59° C., Tm of 122° C., and a zeta potential at pH 4 of −21 mV. It was evident from the zeta potential that the negatively chargeable resin particles contained in the negatively chargeable resin particle dispersion NB were anionic (negatively chargeable).

<Preparation of External Additives>

[Preparation of External Additive EA]

A 2-L three-necked flask equipped with a thermometer and a stirrer was charged with 100 g of silica particles ("QSG-100" manufactured by Shin-Etsu Chemical Co., Ltd., negatively chargeable silica particles), and the air within the flask was replaced with nitrogen to make a nitrogen atmosphere inside the flask. Subsequently, a liquid containing a surface treatment agent (specifically, a liquid obtained by dissolving 15 g of 3-aminopropyltrimethoxysilane in 100 mL of toluene) and distilled water in an amount appropriate to cause a reaction (specifically, hydrolysis) to proceed on surfaces of the silica particles were sprayed into the flask while the flask contents were stirred. Thereafter, the silica particles and the surface treatment agent (specifically, 3-aminopropyltrimethoxysilane) were caused to react for 180 minutes under a condition of a temperature of 250° C. while the flask contents were stirred. As a result, an external additive EA (a powder of surface-treated positively chargeable silica particles) was obtained. The positively chargeable silica particles included in the external additive EA had a number average primary particle diameter of 100 nm.

[Preparation of External Additive EB]

A 2-L three-necked flask equipped with a thermometer and a stirrer was charged with 100 g of titania particles ("KA-30" manufactured by Titan Kogyo, Ltd., negatively chargeable titania particles), and the air within the flask was replaced with nitrogen to make a nitrogen atmosphere inside the flask. Subsequently, a liquid containing a surface treatment agent (specifically, a liquid obtained by dissolving 15 g of 3-aminopropyltrimethoxysilane in 100 mL of toluene) and distilled water in an amount appropriate to cause a reaction (specifically, hydrolysis) to proceed on surfaces of the titania particles were sprayed into the flask while the flask contents were stirred. Thereafter, the titania particles and the surface treatment agent (specifically, 3-aminopropyltrimethoxysilane) were caused to react for 180 minutes under a condition of a temperature of 250° C. while the flask contents were stirred. As a result, an external additive EB (a powder of surface-treated positively chargeable titania particles) was obtained. The positively chargeable titania particles included in the external additive EB had a number average primary particle diameter of 200 nm.

<Production of Toners>

The following describes methods for producing toners TA-1 to TA-8 and TB-1 to TB-5.

[Production of Toner TA-1]

(External Additive Attachment Process)

First, 100 g of the cores CA and 3 g of the external additive EA were mixed for 5 minutes using an FM mixer ("FM-10B" manufactured by Nippon Coke & Engineering Co., Ltd.) under conditions of a rotational speed of 3,500 rpm and a jacket temperature of 20° C. Through the above, the external additive EA (positively chargeable silica particles) was attached to part of surfaces of the cores CA.

Subsequently, the resultant powder was sifted using a 300-mesh sieve (pore size: 48 μm), whereby external additive-attached cores CA-1 were obtained.

(Shell Layer Formation Process)

A 2-L three-necked flask equipped with a thermometer and a stirring impeller was set in a water bath. Then, 300 mL of ion exchanged water was added into the flask, and the internal temperature of the flask was kept at 30° C. using the water bath. Subsequently, pH of the flask contents was adjusted to 4 by adding hydrochloric acid into the flask.

Subsequently, 300 g of the external additive-attached cores CA-1 and 35 g of the positively chargeable resin particle dispersion PA were added into the flask, and the flask contents were stirred for 5 minutes at a rotational speed of 100 rpm. Next, 300 mL of ion exchanged water was added into the flask, and the internal temperature of the flask was increased to 65° C. at a rate of 1° C./minute while the flask contents were stirred at a rotational speed of 100 rpm. Once the internal temperature of the flask reached 65° C., heating was terminated and cold water was added into the flask to cool the flask contents to a temperature of 25° C. at a rate of 10° C./minute. Then, pH of the flask contents was adjusted to 7 (neutralization) with an aqueous sodium hydroxide solution. As a result, a dispersion of toner particles was obtained. The toner particles contained in the dispersion each included the external additive-attached core CA-1 and a shell layer (a layer formed from a thermoplastic resin having a quaternary ammonium cation group) covering regions of a surface of the external additive-attached core CA-1 to which the external additive EA was not attached.

(Washing Process)

Next, the obtained dispersion of the toner particles was filtered (solid-liquid separation) using a Buchner funnel to obtain a wet cake of the toner particles. The obtained wet cake of the toner particles was re-dispersed in ion exchanged water, and then filtered using a Buchner funnel. Re-dispersion and filtration were further repeated five times to wash the toner particles.

(Drying Process and Deagglomeration Process)

Next, the washed toner particles were left to stand in an atmosphere at a temperature of 35° C. and a pressure of 10 kPa for 48 hours to dry the toner particles. The dried toner particles were then deagglomerated for 30 seconds using an FM mixer ("FM-10B" manufactured by Nippon Coke & Engineering Co., Ltd.). Through the above, a positively chargeable toner TA-1 was obtained. The toner particles included in the toner TA-1 had a volume median diameter ($D_{50}$) of 6.0 μm and a roundness of 0.965. Surfaces of the toner particles included in the toner TA-1 were observed in <Measurement of Coverage of External Additive> described below and it was confirmed that the external additive EA covered all of regions of the surfaces of the cores CA that were not covered with the shell layers. Further, cross sections of the toner particles included in the toner TA-1 were observed in <Measurement of Thickness of Shell Layer> described below and it was confirmed that part of surfaces of external additive particles was exposed from the shell layers. In the observation of the cross sections of the toner particles included in the toner TA-1, it was also confirmed that the external additive particles protruded outward in radial directions of the cores CA further than surfaces of the shell layers.

[Production of Toner TA-2]

A positively chargeable toner TA-2 was obtained by the same method as that for production of the toner TA-1 in all aspects other than that 35 g of the positively chargeable resin particle dispersion PB was used instead of 35 g of the positively chargeable resin particle dispersion PA in the shell layer formation process. Toner particles included in the toner TA-2 each included a shell layer formed from a thermoplastic resin having a quaternary ammonium cation group. The toner particles included in the toner TA-2 had a volume median diameter ($D_{50}$) of 6.1 μm and a roundness of 0.964. Surfaces of the toner particles included in the toner TA-2 were observed in <Measurement of Coverage of External Additive> described below and it was confirmed that the external additive EA covered all of regions of surfaces of the cores CA that were not covered with the shell layers. Further, cross sections of the toner particles included in the toner TA-2 were observed in <Measurement of Thickness of Shell Layer> described below and it was confirmed that part of surfaces of external additive particles was exposed from the shell layers. In the observation of the cross sections of the toner particles included in the toner TA-2, it was also confirmed that the external additive particles protruded outward in radial directions of the cores CA further than surfaces of the shell layers.

[Production of Toner TA-3]

A positively chargeable toner TA-3 was obtained by the same method as that for production of the toner TA-1 in all aspects other than that 10 g of the external additive EB was used instead of 3 g of the external additive EA in the external additive attachment process. Toner particles included in the toner TA-3 each included a shell layer formed from a thermoplastic resin having a quaternary ammonium cation group. The toner particles included in the toner TA-3 had a volume median diameter ($D_{50}$) of 6.1 μm and a roundness of 0.963. Surfaces of the toner particles included in the toner TA-3 were observed in <Measurement of Coverage of External Additive> described below and it was confirmed that the external additive EB covered all of regions of surfaces of the cores CA that were not covered with the shell layers. Further, cross sections of the toner particles included in the toner TA-3 were observed in <Measurement of Thickness of Shell Layer> described below and it was confirmed that part of surfaces of external additive particles was exposed from the shell layers. In the observation of the cross sections of the toner particles included in the toner TA-3, it was also confirmed that the external additive particles protruded outward in radial directions of the cores CA further than surfaces of the shell layers.

[Production of Toner TA-4] A positively chargeable toner TA-4 was obtained by the same method as that for production of the toner TA-1 in all aspects other than that 2.0 mL of an aqueous solution of a hexamethylol melamine prepolymer ("MIRBANE (registered Japanese trademark) RESIN SM-607" manufactured by Showa Denko K. K., solid concentration: 80% by mass) was used instead of 35 g of the positively chargeable resin particle dispersion PA in the shell layer formation process. Toner particles included in the toner TA-4 each included a shell layer formed from a melamine resin. The toner particles included in the toner TA-4 had a volume median diameter ($D_{50}$) of 6.2 μm and a roundness of 0.964. Surfaces of the toner particles included in the toner TA-4 were observed in <Measurement of Coverage of External Additive> described below and it was confirmed that the external additive EA covered all of regions of surfaces of the cores CA that were not covered with the shell layers. Further, cross sections of the toner particles included in the toner TA-4 were observed in <Measurement of Thickness of Shell Layer> described below and it was confirmed that part of surfaces of external additive particles was exposed from the shell layers. In the observation of the cross sections of the toner particles included in the toner TA-4, it was also confirmed that the external additive particles protruded outward in radial directions of the cores CA further than surfaces of the shell layers.

[Production of Toner TA-5]

A positively chargeable toner TA-5 was obtained by the same method as that for production of the toner TA-1 in all aspects other than that the amount of the positively chargeable resin particle dispersion PA was changed to 28 g in the shell layer formation process. Toner particles included in the toner TA-5 each included a shell layer formed from a thermoplastic resin having a quaternary ammonium cation group. The toner particles included in the toner TA-5 had a volume median diameter ($D_{50}$) of 6.1 μm and a roundness of 0.960. Surfaces of the toner particles included in the toner TA-5 were observed in <Measurement of Coverage of External Additive> described below and it was confirmed that the external additive EA covered all of regions of surfaces of the cores CA that were not covered with the shell layers. Further, cross sections of the toner particles included in the toner TA-5 were observed in <Measurement of Thickness of Shell Layer> described below and it was confirmed that part of surfaces of external additive particles was exposed from the shell layers. In the observation of the cross sections of the toner particles included in the toner TA-5, it was also confirmed that the external additive particles protruded outward in radial directions of the cores CA further than surfaces of the shell layers.

[Production of Toner TA-6]

A positively chargeable toner TA-6 was obtained by the same method as that for production of the toner TA-1 in all aspects other than that 1.7 mL of an aqueous solution of a hexamethylol melamine prepolymer ("MIRBANE (registered Japanese trademark) RESIN SM-607" manufactured by Showa Denko K. K., solid concentration: 80% by mass) was used instead of 35 g of the positively chargeable resin particle dispersion PA in the shell layer formation process. Toner particles included in the toner TA-6 each included a shell layer formed from a melamine resin. The toner particles included in the toner TA-6 had a volume median diameter ($D_{50}$) of 6.0 µm and a roundness of 0.965. Surfaces of the toner particles included in the toner TA-6 were observed in <Measurement of Coverage of External Additive> described below and it was confirmed that the external additive EA covered all of regions of surfaces of the cores CA that were not covered with the shell layers. Further, cross sections of the toner particles included in the toner TA-6 were observed in <Measurement of Thickness of Shell Layer> described below and it was confirmed that part of surfaces of external additive particles was exposed from the shell layers. In the observation of the cross sections of the toner particles included in the toner TA-6, it was also confirmed that the external additive particles protruded outward in radial directions of the cores CA further than surfaces of the shell layers.

[Production of Toner TA-7]

A positively chargeable toner TA-7 was obtained by the same method as that for production of the toner TA-1 in all aspects other than that the amount of the positively chargeable resin particle dispersion PA was changed to 40 g in the shell layer formation process. Toner particles included in the toner TA-7 each included a shell layer formed from a thermoplastic resin having a quaternary ammonium cation group. The toner particles included in the toner TA-7 had a volume median diameter ($D_{50}$) of 6.0 µm and a roundness of 0.965. Surfaces of the toner particles included in the toner TA-7 were observed in <Measurement of Coverage of External Additive> described below and it was confirmed that the external additive EA covered all of regions of surfaces of the cores CA that were not covered with the shell layers. Further, cross sections of the toner particles included in the toner TA-7 were observed in <Measurement of Thickness of Shell Layer> described below and it was confirmed that part of surfaces of external additive particles was exposed from the shell layers. In the observation of the cross sections of the toner particles included in the toner TA-7, it was also confirmed that the external additive particles protruded outward in radial directions of the cores CA further than surfaces of the shell layers.

[Production of Toner TA-8]

A positively chargeable toner TA-8 was obtained by the same method as that for production of the toner TA-1 in all aspects other than that 2.3 mL of an aqueous solution of a hexamethylol melamine prepolymer ("MIRBANE (registered Japanese trademark) RESIN SM-607" manufactured by Showa Denko K. K., solid concentration: 80% by mass) was used instead of 35 g of the positively chargeable resin particle dispersion PA in the shell layer formation process. Toner particles included in the toner TA-8 each included a shell layer formed from a melamine resin. The toner particles included in the toner TA-8 had a volume median diameter ($D_{50}$) of 6.2 µm and a roundness of 0.950. Surfaces of the toner particles included in the toner TA-8 were observed in <Measurement of Coverage of External Additive> described below and it was confirmed that the external additive EA covered all of regions of surfaces of the cores CA that were not covered with the shell layers. Further, cross sections of the toner particles included in the toner TA-8 were observed in <Measurement of Thickness of Shell Layer> described below and it was confirmed that part of surfaces of external additive particles was exposed from the shell layers. In the observation of the cross sections of the toner particles included in the toner TA-8, it was also confirmed that the external additive particles protruded outward in radial directions of the cores CA further than surfaces of the shell layers.

[Production of Toner TB-1]

A toner TB-1 was obtained by the same method as that for production of the toner TA-1 in all aspects other than that 35 g of the negatively chargeable resin particle dispersion NA was used instead of 35 g of the positively chargeable resin particle dispersion PA in the shell layer formation process. Toner particles included in the toner TB-1 each included a shell layer formed from an n-butyl acrylate polymer. The toner particles included in the toner TB-1 had a volume median diameter ($D_{50}$) of 6.0 µm and a roundness of 0.964. Cross sections of the toner particles included in the toner TB-1 were observed in <Measurement of Thickness of Shell Layer> described below and it was confirmed that external additive particles were covered with the shell layers. That is, surfaces of the external additive particles included in the toner particles of the toner TB-1 were not exposed from the shell layers.

[Production of Toner TB-2]

A toner TB-2 was obtained by the same method as that for production of the toner TA-1 in all aspects other than that 35 g of the negatively chargeable resin particle dispersion NB was used instead of 35 g of the positively chargeable resin particle dispersion PA in the shell layer formation process. Toner particles included in the toner TB-2 each included a shell layer formed from a polyester resin. The toner particles included in the toner TB-2 had a volume median diameter ($D_{50}$) of 6.1 µm and a roundness of 0.965. Cross sections of the toner particles included in the toner TB-2 were observed in <Measurement of Thickness of Shell Layer> described below and it was confirmed that external additive particles were covered with the shell layers. That is, surfaces of the external additive particles included in the toner particles of the toner TB-2 were not exposed from the shell layers.

[Production of Toner TB-3]

A toner TB-3 was obtained by the same method as that for production of the toner TA-1 in all aspects other than that 3 g of silica particles ("QSG-100" manufactured by Shin-Etsu Chemical Co., Ltd., negatively chargeable silica particles) was used instead of 3 g of the external additive EA in the external additive attachment process. Toner particles included in the toner TB-3 each included a shell layer formed from a thermoplastic resin having a quaternary ammonium cation group. The toner particles included in the toner TB-3 had a volume median diameter ($D_{50}$) of 6.0 μm and a roundness of 0.964. Cross sections of the toner particles included in the toner TB-3 were observed in <Measurement of Thickness of Shell Layer> described below and it was confirmed that external additive particles were covered with the shell layers. That is, surfaces of the external additive particles included in the toner particles of the toner TB-3 were not exposed from the shell layers.

[Production of Toner TB-4]

A toner TB-4 was obtained by the same method as that for production of the toner TA-1 in all aspects other than that 35 g of the positively chargeable resin particle dispersion PC was used instead of 35 g of the positively chargeable resin particle dispersion PA in the shell layer formation process. Toner particles included in the toner TB-4 each included a shell layer formed from a thermoplastic resin having a quaternary ammonium cation group. The toner particles included in the toner TB-4 had a volume median diameter ($D_{50}$) of 6.0 μm and a roundness of 0.964. Surfaces of the toner particles included in the toner TB-4 were observed in <Measurement of Coverage of External Additive> described below and it was confirmed that the external additive EA covered all of regions of surfaces of the cores CA that were not covered with the shell layers. Further, cross sections of the toner particles included in the toner TB-4 were observed in <Measurement of Thickness of Shell Layer> described below and it was confirmed that part of surfaces of external additive particles was exposed from the shell layers. In the observation of the cross sections of the toner particles included in the toner TB-4, it was also confirmed that the external additive particles protruded outward in radial directions of the cores CA further than surfaces of the shell layers.

[Production of Toner TB-5]

A toner TB-5 was obtained by the same method as that for production of the toner TA-1 in all aspects other than that 1.4 mL of an aqueous solution of a hexamethylol melamine prepolymer ("MIRBANE (registered Japanese trademark) RESIN SM-607" manufactured by Showa Denko K. K., solid concentration: 80% by mass) was used instead of 35 g of the positively chargeable resin particle dispersion PA in the shell layer formation process. Toner particles included in the toner TB-5 each formed a shell layer formed from a melamine resin. The toner particles included in the toner TB-5 had a volume median diameter ($D_{50}$) of 6.1 μm and a roundness of 0.965. Surfaces of the toner particles included in the toner TB-5 were observed in <Measurement of Coverage of External Additive> described below and it was confirmed that the external additive EA covered all of regions of surfaces of the cores CA that were not covered with the shell layers. Further, cross sections of the toner particles included in the toner TB-5 were observed in <Measurement of Thickness of Shell Layer> described below and it was confirmed that part of surfaces of external additive particles was exposed from the shell layers. In the observation of the cross sections of the toner particles included in the toner TB-5, it was also confirmed that the external additive particles protruded outward in radial directions of the cores CA further than surfaces of the shell layers.

<Measurement of Thickness of Shell Layer>

A toner as a measurement target was dispersed in a cold-setting epoxy resin, and the epoxy resin was caused to harden in an atmosphere at a temperature of 40° C. for 2 days to obtain a hardened material. The obtained hardened material was dyed with osmium tetroxide. Through the above, only shell layers of toner particles were selectively dyed. Subsequently, the dyed hardened material was sliced using an ultramicrotome ("EM UC6" manufactured by Leica Microsystems) equipped with a diamond knife to obtain a thin sample piece. Subsequently, an image of a cross section of the obtained thin sample piece was captured using a transmission electron microscope (TEM, "H-7100FA" manufactured by Hitachi High-Technologies Corporation) at a magnification of 100,000×. The captured TEM image was analyzed using image analysis software ("WinROOF" manufactured by Mitani Corporation) to measure a thickness of the shell layer. Specifically, two straight lines crossing each other at right angles at substantially the center of a cross section of a toner particle were drawn, and a thickness of the shell layer of the toner particle was measured at four locations where the two straight lines intersect with the shell layer. An arithmetic mean of the thus obtained four measurement values was determined as the thickness of the shell layer of the toner particle. The thickness of the shell layer was measured with respect to each of 10 toner particles included in the toner as the measurement target. A number average of the thus obtained measurement values was determined as an evaluation value (thickness of the shell layer) of the toner as the measurement target.

<Measurement of Coverage of External Additive>

A toner as a measurement target was exposed to a steam of 2 mL of a 5% by mass aqueous ruthenium tetroxide solution for 20 minutes in an atmosphere at a temperature of 25° C. to dye the toner with ruthenium. Through the above, surfaces of toner particles included in the toner were selectively dyed only in part of the surfaces constituted by the shell layers, while another part of the surfaces constituted by the external additive particles was not dyed.

Next, an image of the dyed toner was captured using a field emission scanning electron microscope (FE-SEM, "JSM-7600F" manufactured by JEOL Ltd.) to obtain a backscattered electron image (surface image) of the toner particles. The part (dyed part) of the surfaces of the toner particles dyed with ruthenium was brighter than the other part (non-dyed part) of the surfaces of the toner particles that had not been dyed with ruthenium. Note that the backscattered electron image of the toner particles was captured under conditions of an accelerating voltage of 10.0 kV, an irradiation current of 95 μA, a magnification of 250,000×, a contrast of 4,800, and a brightness of 550.

Subsequently, the backscattered electron image was analyzed using image analysis software ("WinROOF" manufactured by Mitani Corporation). Specifically, a surface region (a rectangular region having a size of 2 μm×2 μm) about the center of a toner particle included in the backscattered electron image was cut out, and the thus obtained image data was filtered with a 5×5 Gaussian filter. Note that the surface region about the center of the toner particle was a rectangular region defined to have a size of 2 μm×2 μm using substantially the center of the toner particle in the backscattered electron image as a reference point (the center of gravity of the rectangle). Then, a brightness histogram [vertical axis: frequency (the number of pixels), horizontal axis: brightness] of the filtered image data (region: 2 μm×2 μm, the number of pixels: 1,280×1,024) was obtained. The brightness histogram indicated a brightness distribution of the surface region (dyed part and non-dyed part) of the toner particle. Fitting to a normal distribution by the least-squares method and waveform separation were performed on the thus obtained brightness histogram using solver of spreadsheet software ("MICROSOFT EXCEL (registered Japanese trademark)" manufactured by Microsoft Corporation). As a result, a non-dyed part waveform indicating a brightness distribution of the non-dyed part (normal distribution on low brightness side) and a dyed part waveform indicating a brightness distribution of the dyed part (normal distribution on high brightness side) were obtained. Thereafter, a coverage (unit: %) of the external additive was calculated from respective areas of the obtained two waveforms (RC: area of the non-dyed part waveform, RS: area of the dyed part waveform) by an expression shown below. Note that pixels forming the non-dyed part waveform are thought to indicate the external additive particles in the image data. Pixels forming the dyed part waveform are thought to indicate the shell layer in the image data. Therefore, a proportion (coverage of the external additive) of an area of part of the surface of the toner particle covered with the external additive to an area of the surface of the toner particle can be calculated by the following expression.

Coverage of external additive=100×$RC/(RC+RS)$

Table 1 shows details of cores, shell layers, and external additives of the respective toners TA-1 to TA-8 and TB-1 to TB-5. In Table 1, "PA-QA" represents the thermoplastic resin having a quaternary ammonium cation group contained in the positively chargeable resin particle dispersion PA used in the shell layer formation process. "PB-QA" represents the thermoplastic resin having a quaternary ammonium cation group contained in the positively chargeable resin particle dispersion PB used in the shell layer formation process. "PC-QA" represents the thermoplastic resin having a quaternary ammonium cation group contained in the positively chargeable resin particle dispersion PC used in the shell layer formation process. "MW" represents a melamine resin. "BA" represents an n-butyl acrylate polymer. "PES" represents a polyester resin. "P-Si" represents positively chargeable silica particles. "P-Ti" represents positively chargeable titania particles. "N-Si" represents negatively chargeable silica particles. Note that "-" in the column titled "Softening point" under "Resin" under "Shell layer" indicates that the softening point was not measured. Also, "-" in the column titled "Coverage" under "External additive" indicates that the coverage of an external additive was not measured.

the blended raw materials. Subsequently, the blended raw materials were mixed for 10 hours using a wet-type ball mill while the raw materials were pulverized. Subsequently, the resultant mixture was dried. Subsequently, thermal treatment was performed on the dried mixture at a temperature of 950° C. for 4 hours.

Subsequently, the mixture subjected to thermal treatment was pulverized for 24 hours using a wet-type ball mill to prepare a slurry. Subsequently, drying and granulation of the obtained slurry were performed using a spray dryer. Subsequently, the resultant dry granulated product was left to stand in an atmosphere at a temperature of 1,270° C. having an oxygen concentration of 2% for 6 hours, and then deagglomerated. Thereafter, particle size adjustment was performed, whereby a powder of Mn—Mg—Sr ferrite particles (magnetic carrier cores, number average primary particle diameter: 35 μm) having a saturation magnetization of 70 A·m$^2$/kg in an applied magnetic field of 3,000 ($10^3/4\pi$·A/m) was obtained.

Subsequently, a polyamide-imide resin (a copolymer of a trimellitic anhydride and 4,4'-diaminodiphenylmethane) was diluted with methyl ethyl ketone to prepare a resin solution having a solid concentration of 10% by mass. Subsequently, a tetrafluoroethylene-hexafluoropropylene copolymer (FEP) was dispersed in the obtained resin solution, and a silicon oxide in an amount of 2% by mass relative to a total amount of the resins was further added to the resin solution. Through the above, a carrier coat liquid having a solid content of 150 g was obtained. A mass ratio between the polyamide-imide resin and FEP (polyimide-imide resin:FEP) in the obtained carrier coat liquid was 2:8.

Subsequently, 10 kg of the magnetic carrier cores (Mn—Mg—Sr ferrite particles) obtained as above were coated with the carrier coat liquid using a fluidized bed granulator and coating machine ("SPIRA COTA (registered Japanese trademark) SP-25" manufactured by OKADA SEIKO CO., LTD.). Thereafter, the resultant resin-coated magnetic carrier cores were baked at 220° C. for 1 hour. Through the above, an evaluation carrier was obtained. An amount of the

TABLE 1

| | Core | | Shell layer | | | | External additive | | |
|---|---|---|---|---|---|---|---|---|---|
| | | | | Resin | | | | | |
| Toner | Charging polarity | Softening point [° C.] | Type | Softening point [° C.] | Charging polarity | Thickness [nm] | Type | Charging polarity | Coverage [%] |
| TA-1 | Negative | 98 | PA-QA | 124 | Positive | 50 | P—Si | Positive | 21 |
| TA-2 | Negative | 98 | PB-QA | 125 | Positive | 49 | P—Si | Positive | 22 |
| TA-3 | Negative | 98 | PA-QA | 124 | Positive | 50 | P—Ti | Positive | 21 |
| TA-4 | Negative | 98 | MR | — | Positive | 6 | P—Si | Positive | 21 |
| TA-5 | Negative | 98 | PA-QA | 124 | Positive | 40 | P—Si | Positive | 22 |
| TA-6 | Negative | 98 | MR | — | Positive | 5 | P—Si | Positive | 21 |
| TA-7 | Negative | 98 | PA-QA | 124 | Positive | 55 | P—Si | Positive | 22 |
| TA-8 | Negative | 98 | MR | — | Positive | 7 | P—Si | Positive | 21 |
| TB-1 | Negative | 98 | BA | 122 | Negative | 37 | P—Si | Positive | — |
| TB-2 | Negative | 98 | PES | 122 | Negative | 35 | P—Si | Positive | — |
| TB-3 | Negative | 98 | PA-QA | 124 | Positive | 39 | N—Si | Negative | — |
| TB-4 | Negative | 98 | PC-QA | 95 | Positive | 50 | P—Si | Positive | 21 |
| TB-5 | Negative | 98 | MR | — | Positive | 4 | P—Si | Positive | 22 |

<Evaluation Methods>

[Preparation of Two-component Developer]

Raw materials (MnO, MgO, Fe$_2$O$_3$, and SrO) were blended to give the following mole percentages: 39.7% by mole of MnO, 9.9% by mole of MgO, 49.6% by mole of Fe$_2$O$_3$, and 0.8% by mole of SrO, and water was added to coating resins contained in the evaluation carrier was 1.5% by mass relative to a whole mass of the evaluation carrier.

Then, 100 parts by mass of the evaluation carrier obtained as above and 10 parts by mass of a sample (a toner to be evaluated) were mixed for 30 minutes using a ball mill to obtain a two-component developer.

[Evaluation of Low-temperature Fixability (Minimum Fixable Temperature)]

A color multifunction peripheral ("TASKalfa 5550ci" manufactured by KYOCERA Document Solutions Inc., modified to enable change of a fixing temperature) including a fixing device was used as an evaluation apparatus. The fixing device included a heating roller having a surface made of a tetrafluoroethylene-perfluoroalkylvinylether copolymer (PFA) tube having a film thickness of 30±10 μm and a surface roughness (Ra: arithmetic mean roughness) of 5 μm. The two-component developer prepared as above was loaded into a development device for cyan color in the evaluation apparatus and the toner to be evaluated was loaded into a toner container for cyan color in the evaluation apparatus.

A solid image (specifically, an unfixed toner image) having a size of 25 mm×25 mm was formed on paper (A4 size printing paper) having a basis weight of 90 g/m² using the evaluation apparatus in an environment at a temperature of 25° C. and a relative humidity of 50% under conditions of a linear velocity of 300 mm/second (paper orientation: transverse feed) and a toner application amount of 0.4 mg/cm². Subsequently, the paper with the image formed thereon was passed through the fixing device in the evaluation apparatus. At this time, the fixing temperature of the fixing device was increased from 80° C. in increments of 5° C. and whether or not the solid image (toner image) was fixable to the paper was judged for respective fixing temperatures to determine a lowest temperature (minimum fixable temperature) at which the solid image was fixable to the paper. Whether or not the toner was fixable was confirmed by the following fold-rubbing test. Specifically, the paper passed through the fixing device was folded in half such that a surface with the image formed thereon faced inward and such that a fold passed through the center of the image. Then, a 1-kg brass weight covered with cloth was rubbed back and forth on the fold five times. Subsequently, the paper was opened up and folded part of the paper (part on which the solid image had been formed) was observed. A length of toner peeling (peeling length) in the folded part was measured. A lowest temperature among fixing temperatures for which the peeling length was no longer than 1 mm was determined as the minimum fixable temperature. Evaluation results for the respective toners are shown in Table 2. When the minimum fixable temperature was no higher than 100° C., low-temperature fixability was evaluated as "particularly good". When the minimum fixable temperature was higher than 100° C. and no higher than 105° C., low-temperature fixability was evaluated as "good". When the minimum fixable temperature was higher than 105° C., low-temperature fixability was evaluated as "poor".

[Evaluation of Heat-resistant Preservability (Agglomeration Rate)]

First, 3 g of a toner (a toner to be evaluated) was placed in a polyethylene container (capacity: 20 mL) and the polyethylene container was then sealed. The sealed container was tapped for 5 minutes and then left to stand in a thermostatic chamber set at 60° C. for 8 hours. Thereafter, the toner was taken out of the container and cooled to room temperature (25° C.), whereby an evaluation target was obtained.

The obtained evaluation target was placed on a 300-mesh sieve (pore size: 48 μm) of a known mass. A mass of the sieve including the evaluation target placed thereon was measured to determine a mass of the toner before sifting. Subsequently, the sieve was set in a powder characteristic evaluation machine ("POWDER TESTER (registered Japanese trademark) PT-X" manufactured by Hosokawa Micron Corporation) and shaken for 30 seconds in accordance with a manual of the powder characteristic evaluation machine under a condition of an amplitude of 1.0 mm to sift the evaluation target. A mass of toner that had not passed through the sieve was measured after sifting. An agglomeration rate (unit: % by mass) was calculated from the mass of the toner before sifting and the mass of the toner after sifting by an expression shown below. Evaluation results for the respective toners are shown in Table 2. When the agglomeration rate was no higher than 10% by mass, heat-resistant preservability was evaluated as "good". When the agglomeration rate was higher than 10% by mass, heat-resistant preservability was evaluated as "poor". Note that "mass of toner after sifting" in the following expression means the mass of the toner that had not passed through the sieve and remained on the sieve after sifting.

Agglomeration rate=100×mass of toner after sifting/ mass of toner before sifting

[Evaluation of Thermal-Stress Resistance (Temperature at which Rotational Torque Became 5 mN·m)]

Figure 3:
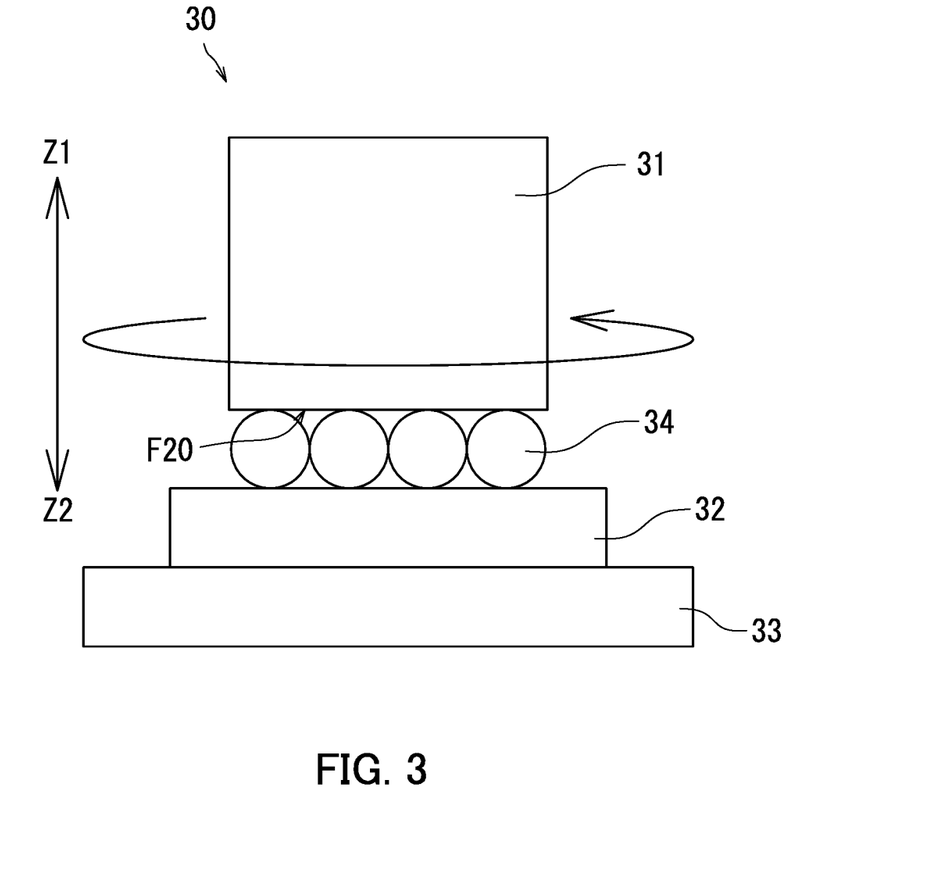
FIG. 3 is a diagram for explaining a method for evaluating thermal-stress resistance.

A rheometer ("MCR-301" manufactured by Anton Paar Japan K.K.) was used as an evaluation apparatus. FIG. 3 is a schematic illustration of the evaluation apparatus (rheometer). The following describes a method for evaluating thermal-stress resistance with reference to FIG. 3.

As illustrated in FIG. 3, an evaluation apparatus 30 includes an aluminum indenter 31, a stainless steel (SUS) plate 32, and a heater 33. The indenter 31 has the shape of a cylinder having a bottom surface F20 with an area of 0.785 cm². The plate 32 is fixed whereas the indenter 31 moves when driven by a motor. The indenter 31 moves in a direction (direction Z1 or Z2) perpendicular to an upper surface of the plate 32, whereby a distance between the bottom surface F20 of the indenter 31 and the upper surface of the plate 32 changes. In a state where toner particles 34 (toner particles included in a toner to be evaluated) are sandwiched between the bottom surface F20 of the indenter 31 and the upper surface of the plate 32, the indenter 31 is moved toward the plate 32 (moved in the direction Z2) to apply a specific pressure to the toner particles 34. Further, the indenter 31 rotates about a rotation axis perpendicular to the upper surface of the plate 32 when driven by the motor.

In evaluation of thermal-stress resistance, a temperature of 1.0 mg of the toner particles 34 was increased at a rate of 2° C./minute while a constant pressing load (3.0 N/cm²) was applied to the toner particles 34 by the indenter 31 rotating in 0.01° rotation angle increments at a frequency of 1 Hz, and a temperature of the toner particles 34 at which the rotational torque of the indenter 31 became 5 mN·m was measured. The rotational torque increases to a value equal to or greater than 5 mN·m when the toner particles start to melt, and tends to start to decrease when the toner particles melt to some extent. When the temperature at which the rotational torque became 5 mN·m was equal to or higher than 58° C., thermal-stress resistance was evaluated as "good". When the temperature at which the rotational torque became 5 mN·m was lower than 58° C., thermal-stress resistance was evaluated as "poor". Evaluation results for the respective toners are shown in Table 2.

TABLE 2

|  | Toner | Low-temperature fixability (Minimum fixable temperature) [° C.] | Heat-resistant preservability (Agglomeration rate) [% by mass] | Thermal stress resistance (Temperature corresponding to 5 mN · m) [° C.] |
| --- | --- | --- | --- | --- |
| Example 1 | TA-1 | 100 | 9 | 59 |
| Example 2 | TA-2 | 100 | 8 | 59 |
| Example 3 | TA-3 | 100 | 9 | 59 |
| Example 4 | TA-4 | 100 | 7 | 59 |
| Example 5 | TA-5 | 100 | 10 | 58 |
| Example 6 | TA-6 | 100 | 8 | 58 |
| Example 7 | TA-7 | 105 | 7 | 60 |
| Example 8 | TA-8 | 105 | 6 | 60 |
| Comparative Example 1 | TB-1 | 90 | 45 | 53 |
| Comparative Example 2 | TB-2 | 90 | 50 | 52 |
| Comparative Example 3 | TB-3 | 95 | 30 | 57 |
| Comparative Example 4 | TB-4 | 90 | 52 | 51 |
| Comparative Example 5 | TB-5 | 95 | 10 | 57 |

The toners TA-1 to TA-8 each included toner particles each including an external additive attached to regions of a surface of a core that were not covered with a shell layer. In each of the toners TA-1 to TA-8, part of surfaces of external additive particles was exposed from the shell layers. In each of the toners TA-1 to TA-8, the external additive particles protruded outward in radial directions of the cores further than surfaces of the shell layers. As shown in Table 1, the shell layers of each of the toners TA-1 to TA-8 contained a thermosetting resin or a thermoplastic resin (second thermoplastic resin) having a higher softening point than the cores. The shell layers of each of the toners TA-1 to TA-8 had a thickness of at least 5 nm.

As shown in Table 2, the toners TA-1 to TA-8 each had an agglomeration rate of no greater than 10% by mass. This indicates good heat-resistant preservability of the toners TA-1 to TA-8. With respect to each of the toners TA-1 to TA-8, a temperature of the toner at which the rotational torque became 5 mN·m was equal to or higher than 58° C. This indicates good thermal-stress resistance of the toners TA-1 to TA-8.

In each of the toners TB-1 to TB-3, surfaces of external additive particles were not exposed from shell layers. As shown in Table 1, shell layers of the toner TB-4 were formed from a thermoplastic resin having a lower softening point than cores. Shell layers of the toner TB-5 had a thickness of smaller than 5 nm.

As shown in Table 2, the toners TB-1 to TB-4 each had an agglomeration rate of greater than 10% by mass. This indicates poor heat-resistant preservability of the toners TB-1 to TB-4. With respect to each of the toners TB-1 to TB-5, a temperature of the toner at which the rotational torque became 5 mN·m was lower than 58° C. This indicates poor thermal-stress resistance of the toners TB-1 to TB-5.

The above results show that the toner according to the present disclosure has improved heat-resistant preservability and improved thermal-stress resistance.

What is claimed is:

1. A toner comprising toner particles, wherein
the toner particles each include a core, a shell layer, and an external additive, the core containing a first thermoplastic resin as a binder resin, the shell layer partially covering a surface of the core, the external additive being attached to regions of the surface of the core that are not covered with the shell layer,
the external additive includes external additive particles,
the external additive particles protrude outward in radial directions of the core further than a surface of the shell layer,
at least part of surfaces of the external additive particles is exposed from the shell layer,
the shell layer contains a second thermoplastic resin or a thermosetting resin, the second thermoplastic resin having a higher softening point than the core, and
the shell layer has a thickness of at least 5 nm.

2. The toner according to claim 1, wherein
the shell layer contains the second thermoplastic resin, and
the softening point of the second thermoplastic resin is at least 25° C. higher than a softening point of the core.

3. The toner according to claim 1, wherein
the shell layer contains the second thermoplastic resin, and
the thickness of the shell layer is at least 40 nm and no greater than 50 nm.

4. The toner according to claim 1, wherein
the external additive particles have a number average primary particle diameter of at least 100 nm and no greater than 200 nm.

5. The toner according to claim 1, wherein
a proportion of an area of the regions covered with the external additive to an area of the surface of the core is at least 20% and no greater than 30%.

6. The toner according to claim 1, wherein
the shell layer and the external additive have a charging polarity opposite to a charging polarity of the core.

7. The toner according to claim 6, wherein
the shell layer and the external additive are positively chargeable, and the core is negatively chargeable.

8. The toner according to claim 7, wherein
the shell layer contains a thermoplastic resin having a quaternary ammonium cation group as the second thermoplastic resin.

* * * * *